United States Patent
Ge et al.

(10) Patent No.: US 12,413,146 B2
(45) Date of Patent: Sep. 9, 2025

(54) AUTOMOTIVE VARIABLE VOLTAGE CONVERTER WITH MULTIPLE SETS OF POWER SWITCHES

(71) Applicant: Ford Global Technologies, LLC, Dearborn, MI (US)

(72) Inventors: Baoming Ge, Okemos, MI (US); Lihua Chen, Farmington Hills, MI (US); Serdar Hakki Yonak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 238 days.

(21) Appl. No.: 17/951,757

(22) Filed: Sep. 23, 2022

(65) Prior Publication Data

US 2024/0106345 A1    Mar. 28, 2024

(51) Int. Cl.
*H02M 3/07*   (2006.01)
*H02M 1/00*   (2007.01)
*H02M 3/158*  (2006.01)

(52) U.S. Cl.
CPC .......... *H02M 3/07* (2013.01); *H02M 1/0095* (2021.05); *H02M 3/158* (2013.01)

(58) Field of Classification Search
CPC ...... H02M 1/0095; H02M 3/07; H02M 3/076; H02M 3/158; H02M 3/1588; B60L 2210/14
See application file for complete search history.

(56) References Cited

U.S. PATENT DOCUMENTS

| | | | |
|---|---|---|---|
| 7,812,579 B2 * | 10/2010 | Williams | H02M 3/07 363/60 |
| 8,575,778 B2 | 11/2013 | Chen | |
| 11,040,632 B2 | 6/2021 | Ge et al. | |
| 2017/0302093 A1 * | 10/2017 | Petersen | H02M 7/4837 |
| 2020/0212801 A1 * | 7/2020 | Cavallini | H02M 3/158 |
| 2021/0129686 A1 * | 5/2021 | Hao | H02M 1/0048 |
| 2021/0234462 A1 * | 7/2021 | Cannillo | G05F 1/595 |
| 2023/0026364 A1 * | 1/2023 | Kulkarni | H02M 3/158 |

FOREIGN PATENT DOCUMENTS

EP        3393029 B1     7/2019

OTHER PUBLICATIONS

T.K. Gachovska and J. L. Hudgins, "SiC and GaN Power Semiconductor Devices," in Power Electronics Handbook, M. H. Rashid, Ed. Cambridge, MA: Elsevier, 2018, pp. 95-155. (Year: 2018).*
Rincon-Mora, G. A. et al., "Unscrambling the power losses in switching boost converters," EE Times, Aug. 18, 2006. [Online], Available: https://www.eetimes.com/unscrambling-the-power-losses-in-switching-boost-converters/. [Accessed Jan. 29, 2025]. (Year: 2006).*

* cited by examiner

*Primary Examiner* — Fred E Finch, III
(74) *Attorney, Agent, or Firm* — David B. Kelley; Brooks Kushman P.C.

(57) ABSTRACT

A variable voltage converter includes a pair of series connected switches, a series connected switch and inductor, and a capacitor having a terminal sharing a node with adjacent terminals of the series connected switches and another terminal sharing a node with adjacent terminals of the series connected switch and inductor such that during operation, a voltage input to the variable voltage converter and a voltage across the capacitor are same and less than a voltage output by the variable voltage converter.

7 Claims, 3 Drawing Sheets

AUTOMOTIVE VARIABLE VOLTAGE CONVERTER WITH MULTIPLE SETS OF POWER SWITCHES

TECHNICAL FIELD

This disclosure relates to vehicle power systems and the control thereof.

BACKGROUND

Certain vehicles may be propelled by electric machines that convert electrical energy to mechanical energy. Traction batteries may supply the electrical energy. Voltage converters electrically between the electric machines and traction batteries may be used to increase or decrease a voltage of the electrical energy.

SUMMARY

A vehicle includes a traction battery, an electric machine, and a variable voltage converter connected between the traction battery and electric machine. The variable voltage converter includes a pair of series connected switches in parallel with the traction battery, a series connected switch and inductor, and a capacitor having a terminal sharing a node with adjacent terminals of the series connected switches and another terminal sharing a node with adjacent terminals of the series connected switch and inductor such that during operation, a voltage of the traction battery and a voltage across the capacitor are same and less than a voltage output of the variable voltage converter.

The variable voltage converter may further include another pair of series connected switches. A terminal of the inductor may share a node with adjacent terminals of the another pair of series connected switches. The variable voltage converter may further include an input capacitor connected between and in parallel with the traction battery and pair of series connected switches. A terminal of the traction battery, a terminal of one of the series connected switches, and a terminal of the switch of the series connected switch and inductor may share a node. The vehicle may further include a DC link capacitor connected between and in parallel with the electric machine and variable voltage converter. The pair of series connected switches may be silicon metal-oxide semiconductor field-effect transistors or silicon insulated-gate bipolar transistors. The another pair of series connected switches may be silicon carbide metal-oxide semiconductor field-effect transistors. During operation, a current through the inductor is half of a current from the traction battery.

An automotive power system has a variable voltage converter including a pair of series connected switches in parallel with a traction battery, a series connected switch and inductor, a capacitor having a terminal sharing a node with adjacent terminals of the series connected switches and another terminal sharing a node with adjacent terminals of the series connected switch and inductor, and another pair of series connected switches. A terminal of the inductor shares a node with adjacent terminals of the another pair of series connected switches. The automotive power system also includes one or more controllers that activate one of the series connected switches and the switch of the series connected switch and inductor with a same duty cycle, and the other of the series connected switches with a duty cycle complementary to the same duty cycle such that a voltage of the traction battery and a voltage across the capacitor are same and less than a voltage output by the variable voltage converter.

The one or more controllers may be further programmed to activate the another pair of series connected switches with complementary duty cycles. A gain of the variable voltage converter may be proportional to a quotient of the same duty cycle and a duty cycle of the another pair of switches. The variable voltage converter may further include an input capacitor connected between and in parallel with the traction battery and pair of series connected switches. A terminal of one of the series connected switches and a terminal of the switch of the series connected switch and inductor may share a node. The pair of series connected switches may be silicon metal-oxide semiconductor field-effect transistors or silicon insulated-gate bipolar transistors. The another pair of series connected switches may be silicon carbide metal-oxide semiconductor field-effect transistors. During operation, a current through the inductor is half of a current from the traction battery.

A method includes operating a variable voltage converter such that one of a pair of series connected switches and a switch of a series connected switch and inductor have a same duty cycle, the other of the pair of series connected switches has a duty cycle complementary to the same duty cycle, another pair of switches has complementary duty cycles, and a voltage input to the variable voltage converter and a voltage across a capacitor having a terminal sharing a node with adjacent terminals of the series connected switches and another terminal sharing a node with adjacent terminals of the series connected switch and inductor are same and less than a voltage output by the variable voltage converter.

The pair of series connected switches may be silicon metal-oxide semiconductor field-effect transistors or silicon insulated-gate bipolar transistors. The another pair of series connected switches may be silicon carbide metal-oxide semiconductor field-effect transistors.

BRIEF DESCRIPTION OF THE DRAWINGS

In the following detailed description, reference is made to the accompanying figures, which form a part thereof, and in which are shown by way of illustration specific embodiments. Other embodiments, of course, are also contemplated and/or described.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
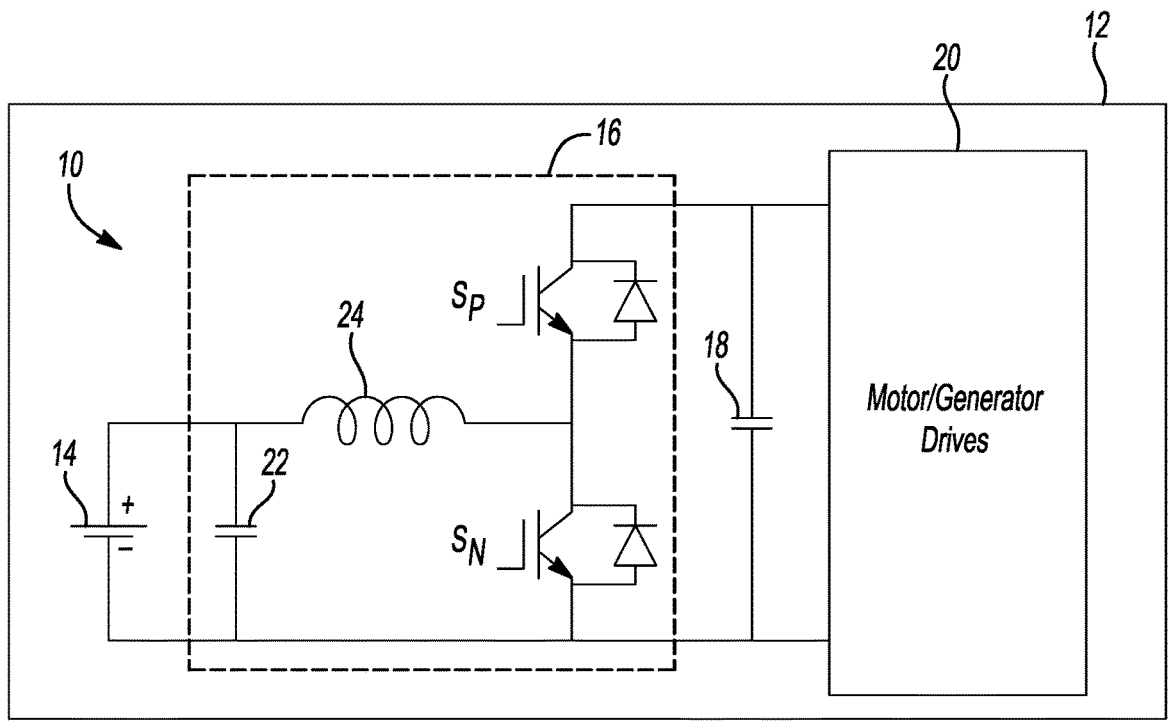
FIG. 1 is a schematic diagram of a typical power system for an electrified vehicle.

FIG. 1 shows a typical variable voltage converter (VVC) based electric drive system 10 used in some hybrid electric vehicles (HEVs) 12. The motor/generator drive performance is enhanced by the VVC's voltage boost function which ensures a desired DC bus voltage regardless of what powers the motor/generator drives.

The VVC based electric drive system 10 includes a traction battery 14, a VVC 16, a DC-link capacitor 18, and motor/generator drives (e.g., electric machine) 20. The VVC 16 is electrically between and in parallel with the traction battery 14 and DC-link capacitor 18. And, the DC-link capacitor 18 is electrically between and in parallel with the VVC 16 and motor/generator drives 20.

The VVC 16 includes an input capacitor 22, an inductor 24, and a pair of switches $S_P$ and $S_N$. The input capacitor 22 is in parallel with the traction battery 14. A terminal of the inductor 24 shares a node with the traction battery 14 and input capacitor 22. The other terminal of the inductor 24 shares a node between the switches $S_P$ and $S_N$.

This type of VVC, however, may encounter a few issues. It may, for example, have a voltage gain limitation. Converter efficiency decreases if the gain is larger than two. Some large gains can be less than three. Also, for high power VVCs, the inductor current may be high, requiring a large inductor core size and copper cross sectional area. The inductor 24 may thus have large size, heavy weight, and high loss, which can challenge inductor packaging and cooling methods.

Existing VVCs have been faced with challenges to transfer high power between low voltage sources/loads and high voltage loads/sources. Continuously reducing the battery pack voltage and increasing the VVC power and DC bus voltage on the inverter side, for example, requires a VVC with high voltage gain and high current capability. Specifically, by adopting emerging higher power and higher energy battery cells to deliver the same power and/or energy, the total number of cells will be dramatically reduced, and the overall battery pack terminal voltage will be reduced as a consequence. The inverter side DC bus voltage, however, may have requirements to be 800V or more to meet maximum electric drive power output. Under such stringent scenarios, existing VVCs may have difficulty meeting these new requirements as suggested by the above details. Here, a high voltage gain VVC with low inductor current is proposed to overcome the issues mentioned above.

Figure 2:
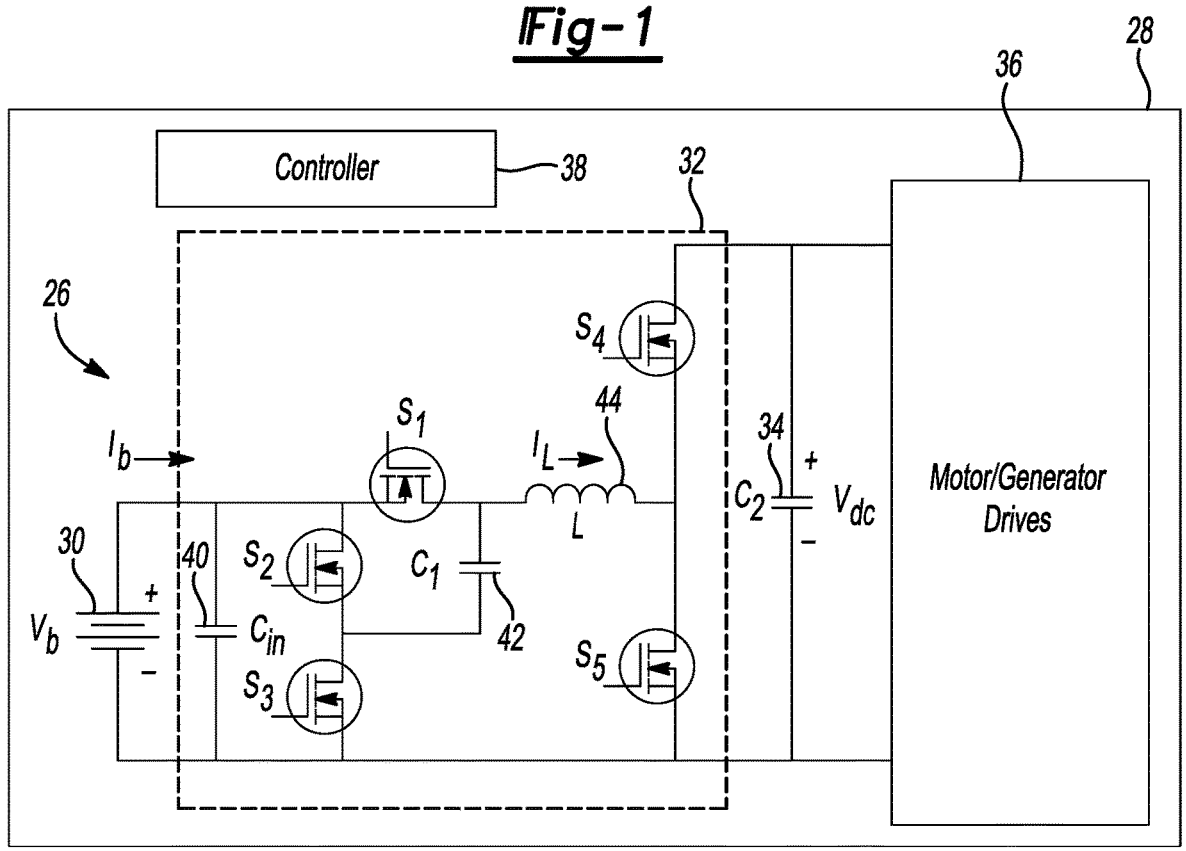
FIG. 2 is a schematic diagram of a power system for an electrified vehicle.
Figure 3A:
FIGS. 3A through 3D show activation protocols for the switches of FIG. 2.
Figure 3B:
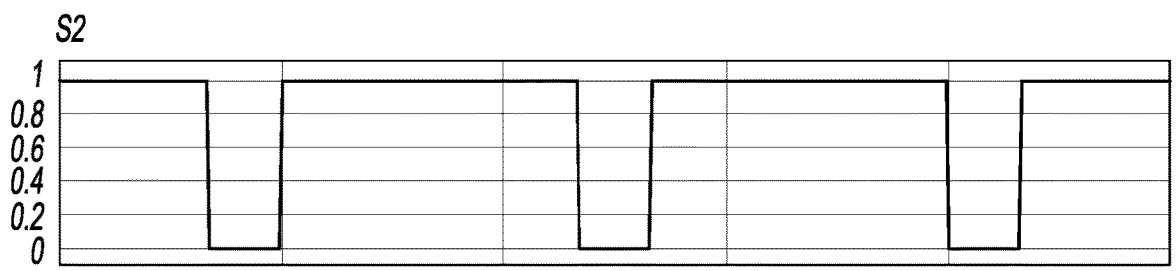
Figure 3C:
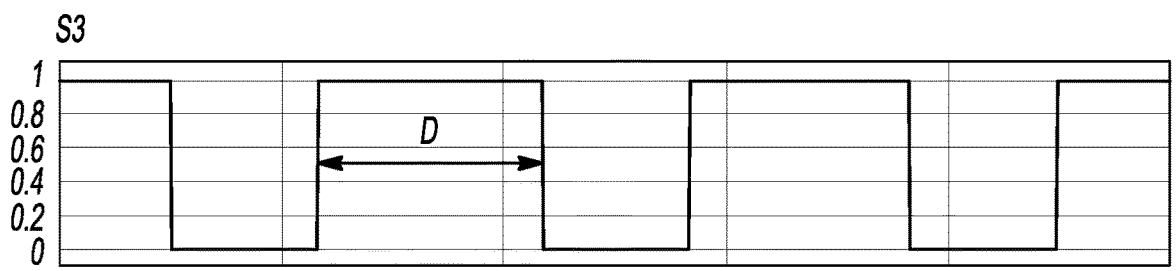
Figure 3D:
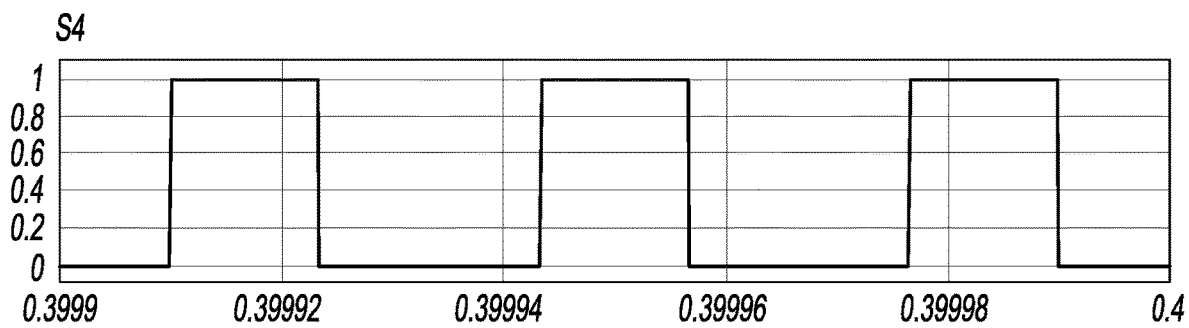

FIG. 2 shows such an example. VVC based electric drive system 26 for vehicle 28 includes a traction battery 30, a VVC 32, a DC-link capacitor 34, motor/generator drives (e.g., inverter and electric machine) 36, and one or more controllers 38. The VVC 32 is electrically between and in parallel with the traction battery 30 and DC-link capacitor 34. And, the DC-link capacitor 34 is electrically between and in parallel with the VVC 32 and motor/generator drives 36. The controllers 38 are in communication with/exert control over the traction battery 30, VVC 32, and motor/generator drives 36, and may operate the VVC 32 according to the switching schemes described below.

The VVC 32 includes an input capacitor 40, switches $S_1$, $S_2$, $S_3$, a capacitor 42, an inductor 44, and switches $S_4$, $S_5$. The input capacitor 40 is in parallel with the traction battery 30. The switches $S_2$, $S_3$ are in series with each other and collectively in parallel with the input capacitor 40. The switch $S_1$ and inductor 44 are in series with each other. A terminal of the capacitor 42 shares a node between adjacent terminals of the switches $S_2$, $S_3$. Another terminal of the capacitor 42 shares a node between adjacent terminals of the switch $S_1$ and inductor 44. And, another terminal of the inductor 44 shares a node with adjacent terminals of the switches $S_4$, $S_5$.

With this arrangement, the voltage stresses of switches $S_1$, $S_2$, $S_3$ are equal to the battery voltage so that low voltage power switches can be used, e.g., silicon metal-oxide semiconductor field-effect transistors or silicon insulated-gate bipolar transistors. Also, the capacitors 40, 42 have voltage stress equal to battery voltage, so capacitors of low voltage rating will have small size and low expense. The voltage stresses of switches $S_4$, $S_5$ are equal to the DC bus voltage. Silicon carbide metal-oxide semiconductor field-effect transistors, for example, can thus be used for this application.

The inductor size has been significantly reduced in comparison to the VVC 16 of FIG. 1. The inductor 44 is arranged such that it is at a $2V_b$ voltage level. Thus, $I_L$ is equal to half of $I_b$, and the inductor core size and copper cross sectional area can be much less than those of typical VVCs. Moreover, the current stresses of the power switches $S_1$, $S_2$, $S_3$ can be much less than those of typical VVCs.

FIGS. 3A through 3D show modulation methods for the switches $S_1$, $S_2$, $S_3$, $S_4$, $S_5$, where d is the duty cycle of switches $S_1$ and $S_3$ and D is the duty cycle of the switch $S_5$. The switches $S_2$ and $S_1$ complement each other. The switches $S_4$ and $S_5$ also complement each other. The voltage gain, G, of VVC 32 is given by $$G=V_{dc}/V_b=(2-d)/(1-D)$$

Figure 4:
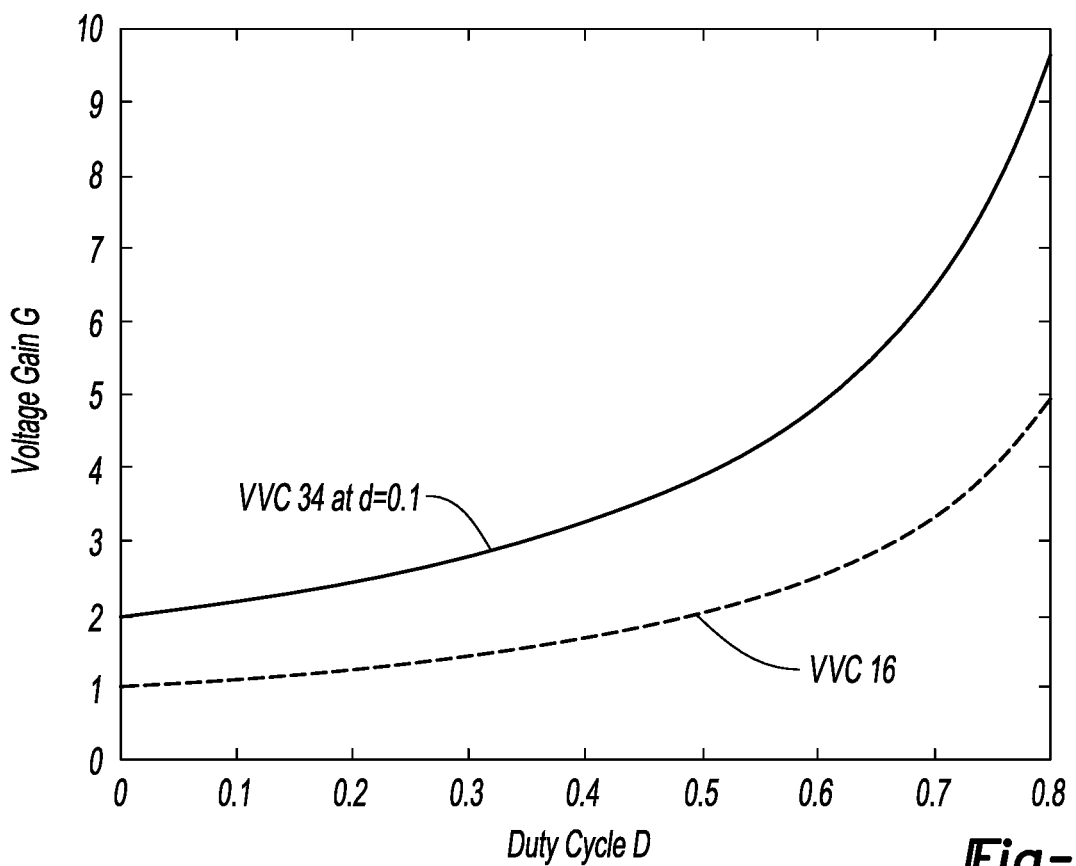
FIG. 4 is a plot of duty cycle versus gain for the VVCs of FIGS. 1 and 2.

FIG. 4 shows voltage gain comparisons between the VVCs 16, 32. The VVC 32 achieves much higher voltage gain than the VVC 16. Moreover, the variables d and D can be used to optimize VVC operation. The DC bus voltage of the VVC 32 thus has a wide range.

Figure 5A:
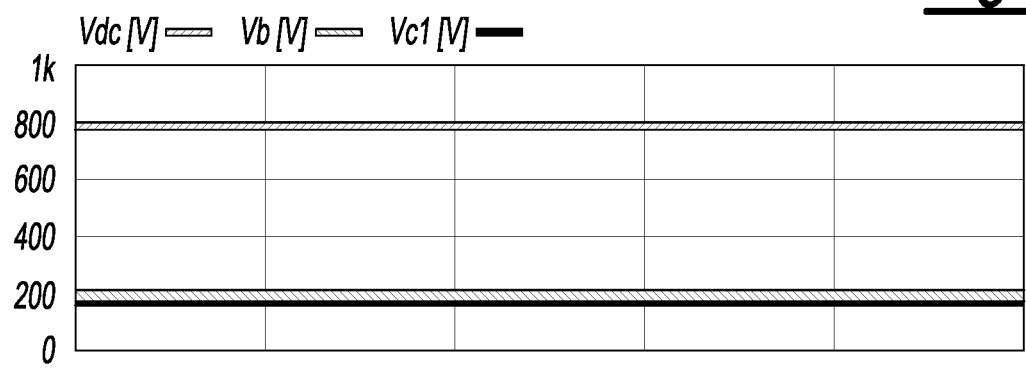
FIGS. 5A and 5B are, respectively, plots of voltage and current simulation results for the VVC of FIG. 2.
Figure 5B:
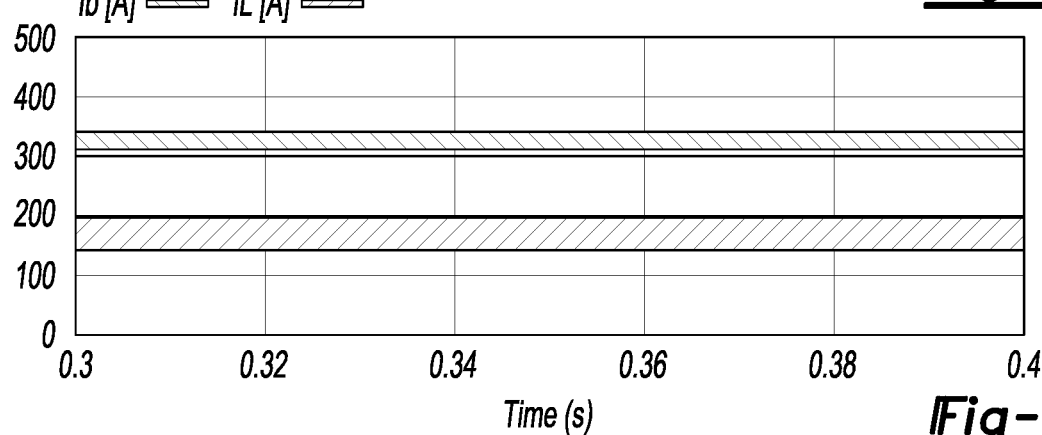

FIGS. 5A and 5B show simulation results that verify operational characteristics of the VVC 32 when, for example, a 200V battery voltage is boosted to 800V, where D=0.54, d=0.1. The inductor current is 175 A even though battery current is 334 A. The inductor current is thus about half of the battery current. The designed inductor needs to handle only 175 A rather than 334 A. When evaluating the VVC 16, the duty cycle D=0.54 can only produce a 435V DC bus voltage and for a 334 A battery current, the inductor 24 needs to be rated for 334 A. A 175 A inductor will be much smaller than a 334 A inductor. As a result, the VVC 32 achieves a higher voltage boost ratio with a smaller inductor when compared with the VVC 16.

The voltages of the capacitor 42 and battery are 200V even though the DC bus voltage is 800V, so the switches $S_1$, $S_2$, $S_3$ have a voltage stress of 200V and the switches $S_4$, $S_5$ have a voltage stress of 800V. As mentioned above, low voltage silicon metal-oxide semiconductor field-effect transistors are a viable option for the switches $S_1$, $S_2$, $S_3$. 1200V silicon carbide metal-oxide semiconductor field-effect transistors are a viable option for the switches $S_4$, $S_5$.

The proposed VVCs have a different circuit topology from existing VVCs, and have high voltage gain. The inductor size of some of the proposed VVCs is significantly smaller in comparison to certain other existing VVCs because the inductor current is half of the battery current in the proposed VVCs. The current stresses of power switches in the proposed VVCs are also lower than those of existing VVCs. Transistors rated for low voltage can thus be used.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims.

The words used in the specification are words of description rather than limitation, and it is understood that various changes may be made without departing from the spirit and scope of these disclosed materials. The words controller and controllers, and variations thereof for example, may be interchanged.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An automotive power system comprising:
   a variable voltage converter including a pair of series connected switches in parallel with a traction battery, a series connected switch and inductor, a capacitor having a terminal sharing a node with adjacent terminals of the series connected switches and another terminal sharing a node with adjacent terminals of the series connected switch and inductor, and another pair of series connected switches, wherein a terminal of the inductor shares a node with adjacent terminals of the another pair of series connected switches; and
   one or more controllers programmed to activate one of the series connected switches and the switch of the series connected switch and inductor with a same duty cycle, and the other of the series connected switches with a duty cycle complementary to the same duty cycle such that a voltage of the traction battery and a voltage across the capacitor are same and less than a voltage output by the variable voltage converter, wherein a gain of the variable voltage converter is proportional to a quotient of the same duty cycle and a duty cycle of the another pair of switches.

2. The automotive power system of claim 1, wherein the one or more controllers are further programmed to activate the another pair of series connected switches with complementary duty cycles.

3. The automotive power system of claim 1, wherein the variable voltage converter further includes an input capacitor connected between and in parallel with the traction battery and pair of series connected switches.

4. The automotive power system of claim 1, wherein a terminal of one of the series connected switches and a terminal of the switch of the series connected switch and inductor share a node.

5. The automotive power system of claim 1, wherein the pair of series connected switches are silicon metal-oxide semiconductor field-effect transistors or silicon insulated-gate bipolar transistors.

6. The automotive power system of claim 1, wherein the another pair of series connected switches are silicon carbide metal-oxide semiconductor field-effect transistors.

7. The automotive power system of claim 1, wherein during operation, a current through the inductor is half of a current from the traction battery.

\* \* \* \* \*